United States Patent
Baumgartner et al.

(10) Patent No.: US 8,136,639 B2
(45) Date of Patent: Mar. 20, 2012

(54) SELF-ENERGIZING DISK BRAKE

(75) Inventors: Johann Baumgartner, Moosburg (DE);
Steffen Geissler, Ilallbergmoos (DE);
Robert Trimpe, Wessling (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 772 days.

(21) Appl. No.: 12/162,114

(22) PCT Filed: Jan. 25, 2007

(86) PCT No.: PCT/EP2007/000617
§ 371 (c)(1),
(2), (4) Date: Nov. 18, 2008

(87) PCT Pub. No.: WO2007/085440
PCT Pub. Date: Aug. 2, 2007

(65) Prior Publication Data
US 2009/0205911 A1    Aug. 20, 2009

(30) Foreign Application Priority Data

Jan. 26, 2006   (DE) .......................... 10 2006 003 749

(51) Int. Cl.
*F16D 55/14* (2006.01)
(52) U.S. Cl. ..................................... 188/72.2; 188/72.7
(58) Field of Classification Search ................ 188/70 B, 188/72.2, 72.7
See application file for complete search history.

(56) References Cited

U.S. PATENT DOCUMENTS

| 7,172,056 B2 | 2/2007 | Baumann et al. |
| 7,240,773 B2 | 7/2007 | Baumgartner |
| 2005/0247527 A1 | 11/2005 | Severinsson |
| 2006/0175163 A1* | 8/2006 | Severinsson .................. 188/265 |
| 2006/0201756 A1* | 9/2006 | Severinsson .................. 188/72.2 |

FOREIGN PATENT DOCUMENTS

| DE | 3610569 A1 | 10/1987 |
| DE | 37 16 202 A1 | 11/1988 |
| DE | 199 31 228 A1 | 1/2001 |

(Continued)

OTHER PUBLICATIONS

International Search Report dated Aug. 10, 2007 with English translation of relevant portion (Five (5) pages).
PCT/ISA/237 including English translation (Sixteen (16) pages).

*Primary Examiner* — Robert Siconolfi
*Assistant Examiner* — Vu Q Nguyen
(74) *Attorney, Agent, or Firm* — Crowell & Moring LLP

(57) ABSTRACT

A Self-energizing disk brake having an electric actuator for applying an actuating force is described. The brake has a self-energizing device for boosting the electric actuator, arranged between the actuator and the brake lining, and a brake application unit for applying at least one brake lining to one side of a brake disk. The application movement of the brake lining to the brake disk is resolvable into at least one parallel movement component and at least one movement component extending one of tangentially and perpendicularly relative to the brake disk rotational axis. The brake also includes at least one electric motor drive for actuating the brake application unit, which has a crank with a crank pin extending parallel to the brake disk axis and serving to move the brake lining unit tangentially with respect to the brake disk, parallel to the friction face of the brake disk.

12 Claims, 6 Drawing Sheets

FOREIGN PATENT DOCUMENTS

| | | |
|---|---|---|
| DE | 101 57 324 A1 | 6/2003 |
| DE | 102 01 221 A1 | 7/2003 |
| DE | 101 64 317 C1 | 10/2003 |
| DE | 102 26 035 A1 | 12/2003 |
| DE | 103 24 424 A1 | 12/2004 |
| DE | 10 2005 030 617 A1 | 4/2006 |
| EP | 0 688 404 B1 | 12/1995 |
| WO | WO 02/14708 A2 | 2/2002 |
| WO | WO 03/106857 A1 | 12/2003 |
| WO | WO 2005/031184 A1 | 4/2005 |
| WO | WO 2005/064195 A1 | 7/2005 |
| WO | WO 2006/042620 A1 | 4/2006 |

* cited by examiner

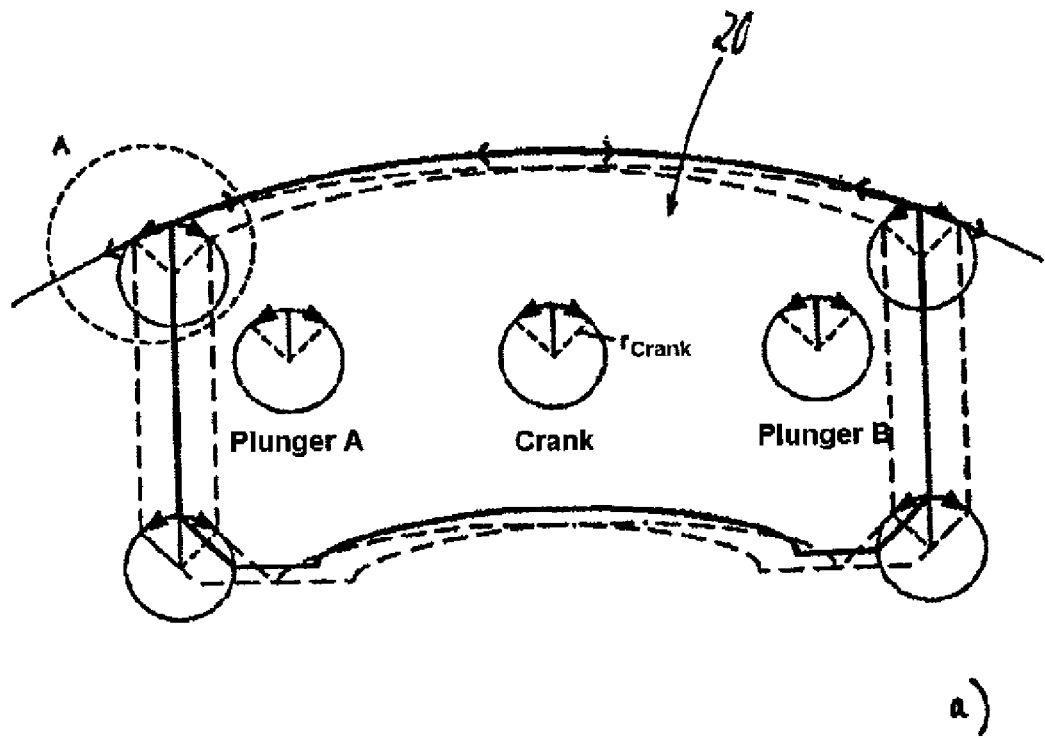
a)
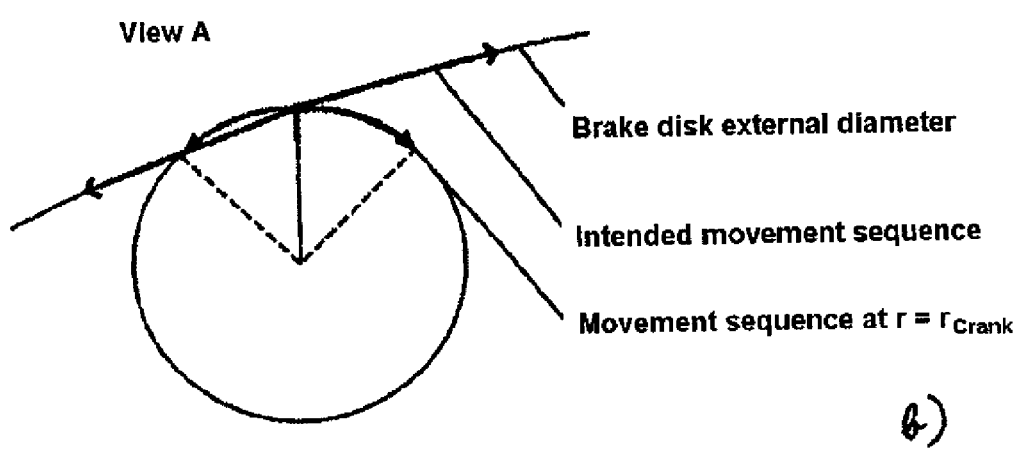
b)
Fig. 4

SELF-ENERGIZING DISK BRAKE

BACKGROUND AND SUMMARY OF THE INVENTION

The invention relates to a self-energizing disk brake with an electric actuator.

A conventional self-energizing disk brake for passenger cars is disclosed by German Patent document DE 101 643 17.

Self-energizing brakes are known in a very wide variety of embodiments. The drum brakes represent a classic design of self-energizing brakes, where at least one brake shoe is arranged to be leading, with the result that the frictional forces between the brake lining and the drum assist the brake application force.

If, in relatively heavy commercial vehicles, disk brakes having actuating devices which are operated by electric motor are also to be used, the self-energizing disk brake becomes an option. Because it provides the possibility of giving the electric motor smaller dimensions on account of the self-energizing action of the brake than would be possible in the case of a disk brake which is not self-energizing, these brakes make electric actuator possible.

The majority of the known solutions relate to operating principles which, although they make self-energizing possible, are not suitable in general for realizing a disk brake for heavy commercial vehicles which can be produced economically and is ready for series production, on account of the lack of suitability in practice and on account of the complicated structural construction, and they have therefore often not passed the stage of theoretical considerations.

Against this background, the present invention provides a self-energizing disk brake which is operated by an electric motor, has a simple structural construction and realizes a largely uniform wear behavior of the brake disk or the brake disk ring.

In an exemplary embodiment, the brake application unit is designed to move the brake lining or the brake lining unit on a nonstraight path, in particular an arched curve path, parallel to the friction face of the brake disk. The brake application unit includes a crank which has a crank pin which extends parallel to the brake disk axis, and serves to move the brake lining unit tangentially with respect to the brake disk, that is to say parallel to the friction face of the brake disk, and engages positively into a corresponding opening in the pressure plate, with the result that the brake lining unit follows the movement of the crank directly and immediately.

The exemplary design leads to a particularly uniform brake application and to a relatively uniform wear behavior of the brake disk or the brake disk ring, since it is prevented that the linings of the partially lined disk brake dig into the disk in a certain region. In addition, the crank drive is a structurally simple and nevertheless a particularly reliable solution for applying the brake.

In one example, the brake application unit is designed to move the brake lining parallel to the brake disk on a curved path which is approximated to the ring geometry of the brake disk. Here, the expression "curved path" is not to be interpreted too narrowly. In another embodiment, an approximate curved path may be composed of straight chord segments which are oriented at an angle with respect to one another.

If each of the pressure faces of the at least two or more brake plungers which can preferably have their length varied axially by retracting into themselves, is provided at its side which faces the brake lining unit with a recess having a ramp-shaped contour, into which in each case a rolling body engages which is supported on one side on the ramp-shaped contour of the pressure faces of the brake plungers and on the other side on the brake lining unit, the self-energizing brake can be used in a particularly versatile manner and can be controlled reliably. It is preferred in this example if the at least one electric motor drive is designed for actuating the brake application unit or, furthermore, the further electric motor drive is designed for driving the brake plungers at least for changing the axial length of the brake plungers.

In a particularly advantageous example, the ramp-shaped contour is configured in the manner of a groove with a constant or changing ramp angle, which groove describes a curved path.

In order to enable braking operations during forward and reverse driving, it is advantageous, furthermore, if, starting from the lowest point, the ramp-shaped contour describes a curved path in two directions, or forms a curved groove.

The electric motor in this example turns a crank directly or via at least one or more gear mechanisms, which crank has a crank pin which extends parallel to the brake disk axis and engages positively into a correspondingly oriented opening in the pressure plate. This results in a type of rotary bearing is formed, about which the brake linings rotate when they are guided on the curved paths in the ramp faces (the rotary bearing itself moving on a circular path with a small radius).

The curved path preferably has the shape of a circular arc section, the radius of which corresponds to the radius of the circular path, on which the crank moves.

In order to convert the drive movement of the crank into the movement of the brake lining unit, in this example the crank pin engages into a correspondingly oriented opening in the pressure plate.

The compact and inexpensive construction of the self-energizing disk brake is optimized by the fact that the electric motor has an output shaft which is oriented parallel to the brake disk axis and which drives directly or via further gear mechanism elements which are connected in between and likewise have rotational axes which are oriented parallel to the rotational axis of the brake disk, so that a compact construction results which is favorable in terms of production.

In some embodiments, a design of the brake application unit is provided in such a way that it converts uniform rotation of an output shaft of the electric motor drive during a brake application movement into a movement of the brake lining, the movement having a component which is not linear at least in the tangential direction (direction U).

In this way, not only are the production costs of the brake system for commercial vehicles reduced, but the power requirement of the electric motor drive is also minimized considerably by efficient self-energizing with respect to comparable brakes which are actuated electromagnetically and directly, even in the limiting range of the coefficient of friction of the brake lining. According to a particularly advantageous embodiment, it is even possible to reduce the power requirement considerably in comparison with other self-energizing concepts.

In a simple exemplary case, the paths for the rolling bodies or channels have a radius which corresponds to the radius of the curved path of the crank during its movement on a circular path. In this example, the brake lining unit remains oriented parallel to itself during a circumferential displacement, that is to say each point on the brake lining unit performs in each case the same movement. In another example, a rotational movement which has a radius which deviates from the circular path of the crank and is adapted in as optimum a manner as possible to the ring geometry of the brake disk can be superimposed on this movement of the brake lining unit.

As an alternative, according to another exemplary embodiment, cylindrical rolling bodies or rolling bodies which are shaped in another way (for example, barrels) may be utilized, for example, which would then roll on a correspondingly curved groove-like recess in the brake plungers.

The electric motor drive is preferably coupled as an actuator to a control and/or regulating device which is designed for controlling or regulating the position of the actuator and therefore of the brake lining.

Other objects, advantages and novel features of the present invention will become apparent from the following detailed description of the invention when considered in conjunction with the accompanying drawings.

BRIEF DESCRIPTION OF THE DRAWINGS

In the following text, the invention will be described in greater detail using exemplary embodiments and with reference to the drawing, in which:

FIG. 4 shows a diagram illustrating the movement of the brake lining on the brake ring.

DETAILED DESCRIPTION OF THE DRAWINGS

Figure 1:
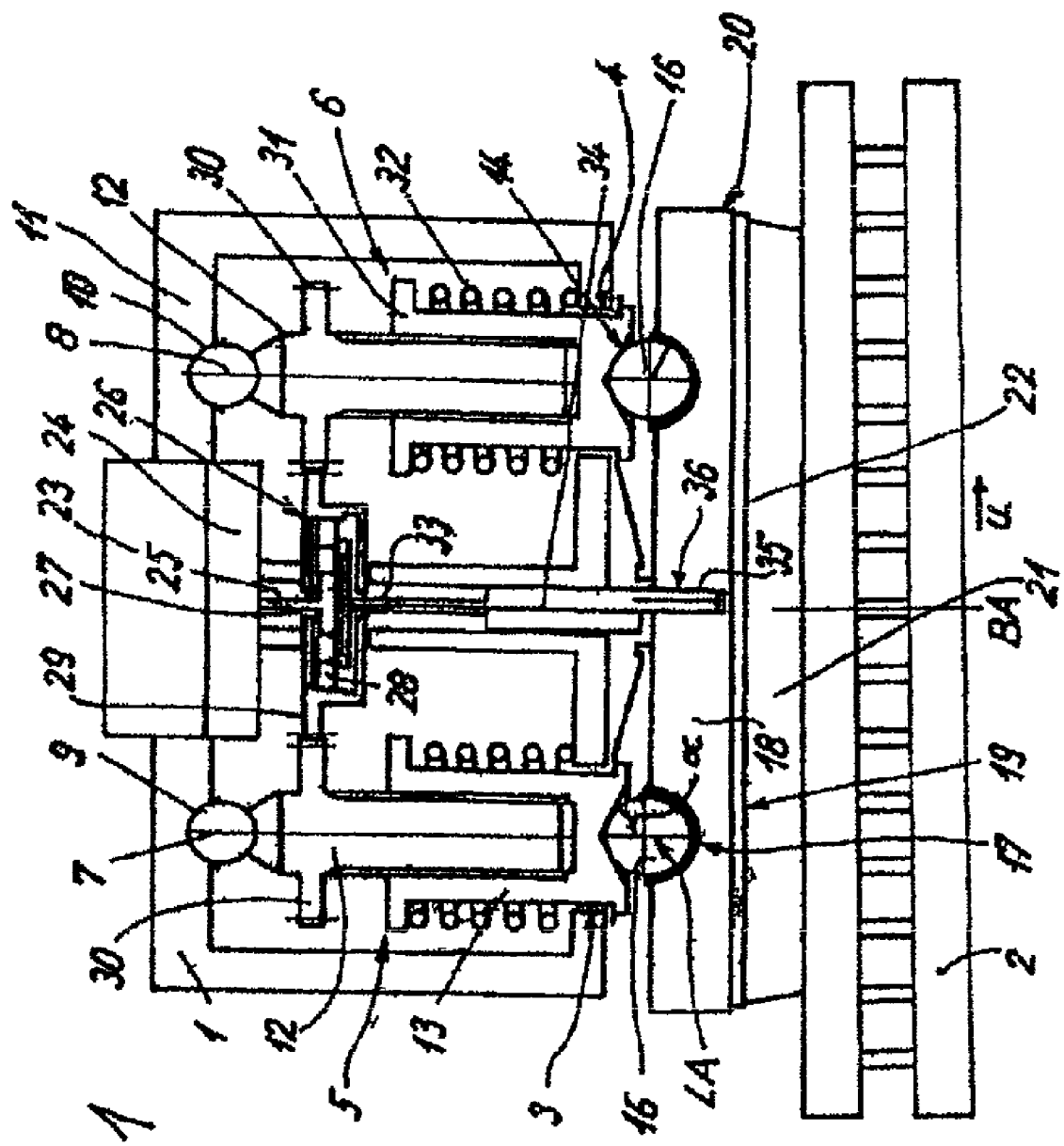
FIG. 1 shows a diagram which illustrates the principle design of a self-energizing disk brake.
Figure 2:
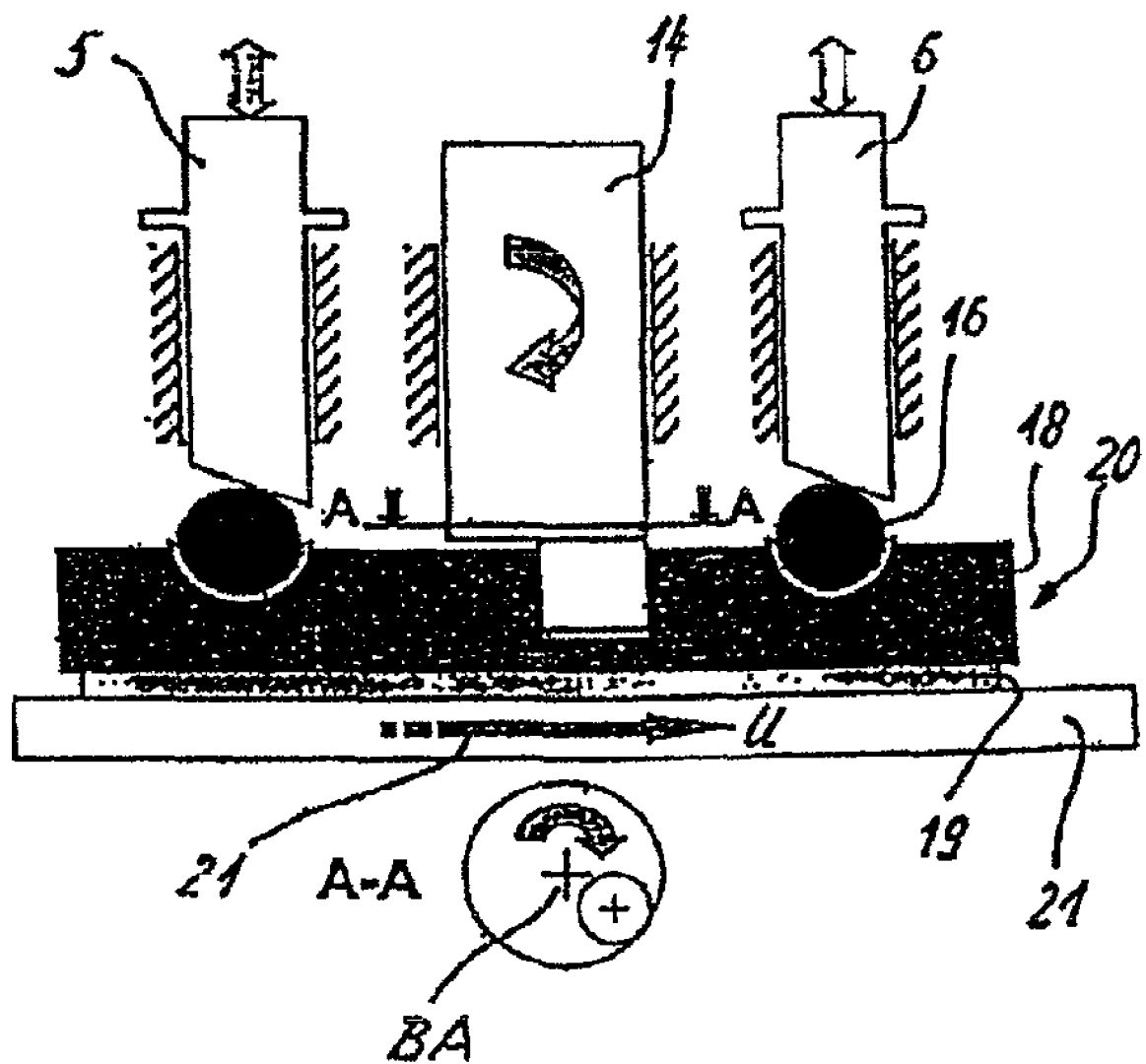
FIG. 2 shows another diagram illustrating the principle function of the disk brakes shown in FIG. 1.
Figure 3:
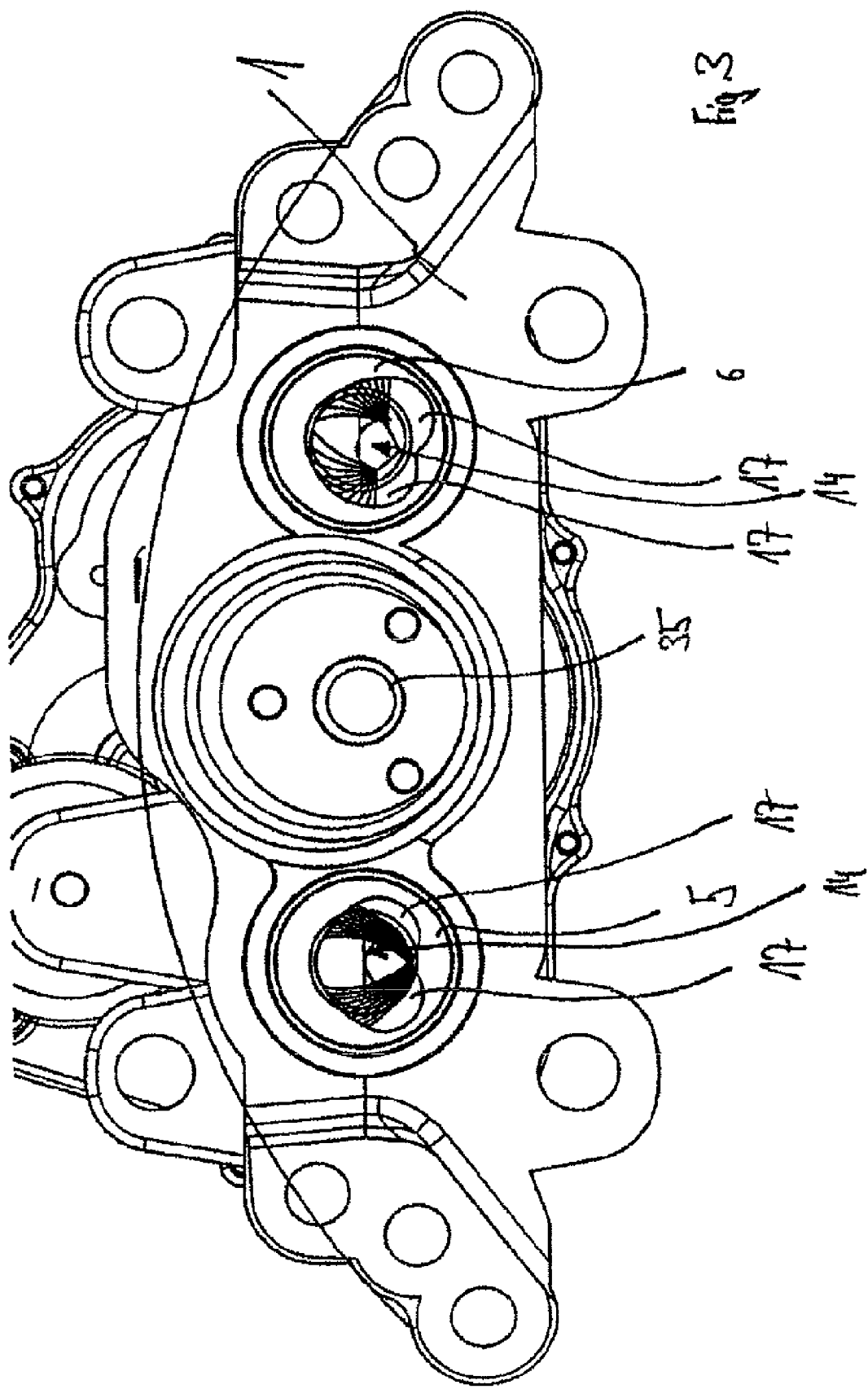
FIG. 3 shows a perspective view of a region of the brake according to the design shown in FIG. 1.

The various embodiments which are shown will be described with their essential features in the following text:

A functional principle of the invention shown in FIG. 1 is described in greater detail by using a depiction of a nonadjustable ramp slope formed on the pressure faces 5, 6 of the brake plungers. FIG. 2 further illustrates these functional principle in conjunction with FIG. 1.

Figure 6:
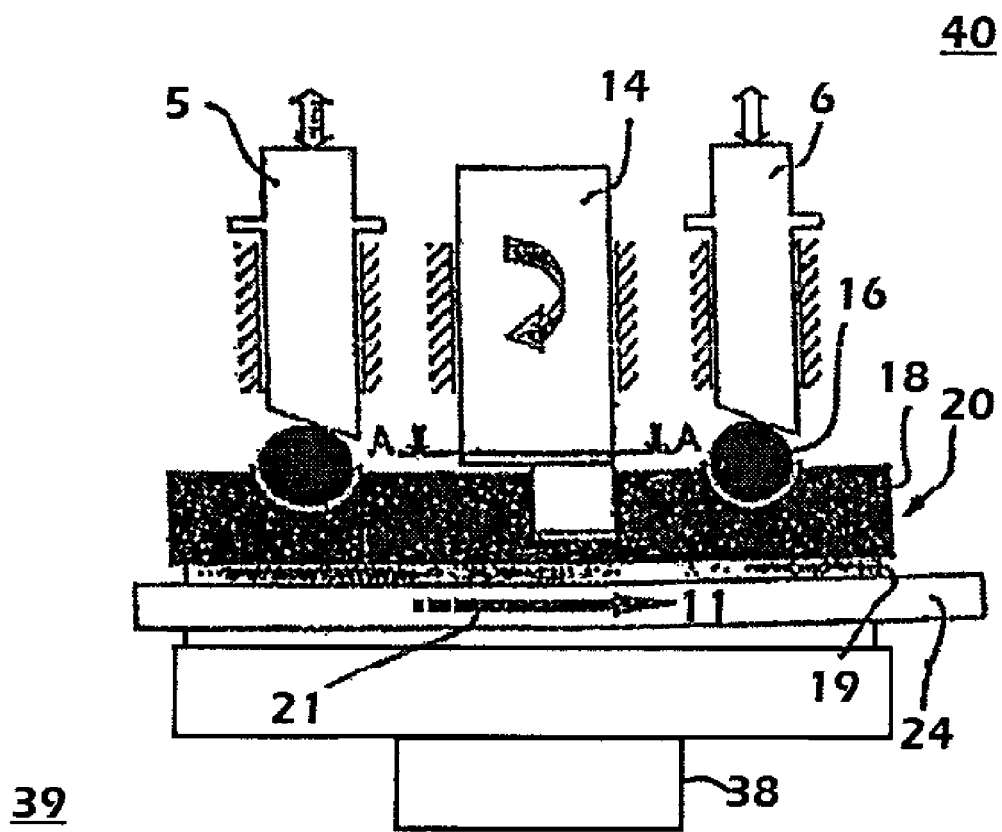
FIG. 6 shows a schematic illustration of a disc brake having an electric adjustment unit on a reaction side of the brake in accordance with an embodiment of the present invention.

The disk brakes according to the examples of the invention preferably have a fixed caliper construction, in which the single part or multiple part brake caliper 1 (also called brake housing) is fastened to the wheel axle such that it cannot move relative to a brake disk 2. To this extent, according to the exemplary embodiments that are described in the following text, a fixed caliper brake having an external wear adjusting elements is provided, which is actuated electromechanically and regulated electronically. The operating principle and the described features can also be used for other exemplary brake designs, such as sliding caliper or pivoting caliper brakes. Only the caliper head, of the basic brake, which includes the brake actuating elements, that is actuated mechanically/pneumatically is replaced by a self-energizing electromechanical brake application device. A conventional fixed caliper brake having a pneumatically actuated brake application device is disclosed, for example, by German patent documents DE 36 10 569 A1, DE 37 16 202 A1 or EP 0 688 404 A1. A fixed caliper brake having electric motor adjustment is disclosed by International patent document WO 02/14 708 A1. Electric motor adjusting devices of this type can be arranged for example, on the reaction side in the proposed exemplary embodiments of the invention, if desired. A single adjusting apparatus having an electric motor drive can also be arranged only on the reaction side, as schematically shown in FIG. 6 (adjusting apparatus 38 on reaction side 39 of brake 40). This exemplary variant is particularly inexpensive and saves installation space, in particular, in a disk brake having a self-energizing device, an electric motor actuator and a fixed caliper, and is therefore also to be considered to be a separate embodiment.

In FIG. 1, the brake caliper 1 is shown only in its brake application region. In practice, it preferably reaches in the manner of a frame around the upper circumferential region of the brake disk and is fastened to an axle flange (not shown).

On its side which faces the brake disk 2 with the brake disk rotational axis, the brake caliper 1 has one or more, and preferably two openings 3, 4 and a corresponding number of brake plungers 5, 6 (two in this case) which are oriented parallel to the brake disk axis BA.

According to FIGS. 1 to 4, in each case two brake plungers 5, 6 are arranged parallel to one another.

The two brake plungers 5, 6 or adjusting pistons are supported in each case directly or via elements which are connected in between (sliding bearing shells 9, 10 in this case) on the rear wall 11 of the brake caliper which faces away from the brake disk. Balls 7, 8 having sliding bearing shells 9 are preferably used as bearing devices.

The bearing devices are designed in such a way that they permit the rotation of the brake plungers 5, 6 or adjusting pistons about their own longitudinal axis LA.

In this example, recesses in the manner of spherical segments (or in the manner of spherical caps) are formed in each case in the brake plunger 5, 6 and in the brake caliper, the sliding bearing shells 9, 10 being inserted into one of said recesses. For example, into the recess in the brake caliper in this case, with the result that the balls 7, 8 can rotate relative to the sliding bearing shell.

As an alternative, the balls 7, 8 can also be configured as spherical projections at those ends of the brake plungers 5, 6 which face the brake caliper (not shown here), which spherical projections then engage into corresponding recesses in the brake caliper with sliding bearing shells.

Flat sliding bearings or annular bearings or the like (not shown here) may also be used in other embodiments, instead of the balls and recesses.

The brake plungers 5, 6 have in each case one spindle 12 which is provided with an external thread and on which a sleeve-like nut 13, with a corresponding internal threads is arranged such that it can be rotated. Depending on the design, this thread can be self-locking or not self-locking.

On their side which faces away from the brake disk, the nuts 13 have a flange 31, in each case compression springs 32 are used acting between the flange 31 and the inner wall of the brake caliper 1, which compression springs 32 surround the nut 13 concentrically and exert a predefined force on the flange or prestress the flange 31 relative to the inner wall of the brake caliper.

As an alternative, the entire mechanism is stressed against the pressure plates.

According to FIGS. 1 to 4, the nut 13 of each brake plunger 5, 6 is arranged on the side which faces the brake disk, and the spindle 12 is arranged on the side which faces the interior of the brake caliper. An inverted arrangement may also be used in another example (not shown here).

The axial length of each individual brake plunger 5, 6 which is formed in this way can be adjusted by rotating the nut 13 on the spindle, for example, in order to compensate for brake lining wear and when bringing the linings into contact with the brake disk 2.

On their side which faces the brake disk, that is to say on their pressure faces, the brake plungers 5, 6, the nuts 13 in this case, are provided in each case with a ramp-like recess or contour 14, the lowest point of which preferably lies in the region of the longitudinal axis of the brake plungers.

In each case rolling bodies 16 which are configured here in a preferred refinement as balls 16 engage into the recesses 14.

On their sides which face away from the brake disk, the rolling bodies 16 engage into sliding bearing shells 17 which are configured according to the design of the rolling bodies (in the shape of spherical caps in this example) and are inserted into recesses of a corresponding shape in a pressure plate 18 which bears against the carrier plate 19 of an application-side brake lining 20, having brake lining material 21 which is arranged in the brake caliper 1 such that it can be moved parallel to the brake disk rotational axis BA, and in the circumferential direction U (or tangentially or parallel with respect to the tangential) relative to the brake disk 2.

A clamp spring 22 between the pressure plate 18 and nuts 13 holds the pressure plate 18 on the nuts 13 under prestress. As an alternative, it is also possible to stress the pressure plate in another way, for example on the housing or the caliper.

An electric drive motor 23 serves to drive the brake, which electric drive motor 23 is preferably arranged in front of a step down gear mechanism 24, the output shaft 25 of which acts on a further gear mechanism 26, in particular a planetary gear mechanism, which is arranged centrally between the spindles.

In this example, the output shaft 25 drives a sun gear 27 of the planetary gear mechanism 26 which drives planetary gears 28. The planetary gears 28 mesh with the sun gear 27 and a ring 29 which has internal and external toothing. Depending on the switching state, the gears set either the planetary star 33 or the ring 29 in rotation. The ring 29 meshes by way of its external toothing with gearwheels 30 which are placed onto the spindles 12 or are integrally formed on the latter.

A spring-loaded ball latching mechanism (not shown here) can be provided for automatic switchover of the drive for example, in an electric motor. The switchover operation can also be realized in another way (for example, electromagnetically).

In an exemplary axial extension of the planetary star 33, a crank 34 is provided which is of cylindrical configuration here, is arranged parallel to the brake disk axis and, on its side which faces the brake disk 2, engages into a corresponding opening 36 in a brake lining unit by way of an eccentrically configured crankpin 35 which is likewise oriented parallel to the brake disk axis BA, the opening 36 preferably having a cross section which corresponds to the cross section of the crank pin 35.

In the exemplary embodiment of FIG. 1, the actuating device or brake application unit includes the two adjusting pistons or brake plungers 5, 6 which can have their length varied for the purpose of wear adjustment and, in their pressure face which faces the brake disk 2, have the recesses 14 shaped as ramp contours, on which the rolling bodies 16 run which transmit the brake application force, which is generated by the brake, to the brake lining unit or to the pressure plate which lies on the brake lining.

In the pressure face of the brake lining unit, i.e. the pressure plate 18, the rolling bodies 16 are received via a ramp profile of opposite design (not shown here) or preferably, since the rolling bodies are guided particularly reliably, in the sliding bearing bed (sliding bearing shells 17). An inverted arrangement with ramps in the brake lining unit and a sliding bearing bed for the rolling bodies in the brake plungers 5, 6 may also be used.

The exemplary brake lining unit, including the single part or multiple part combination of brake linings 20 and pressure plate 18, is pressed resiliently against the brake plungers and adjusting pistons 5, 6 in such a way that the rolling bodies 16 which lie between them are clamped elastically between the brake lining unit and the brake plungers.

After a contact operation of the brake lining 20 against the brake disk, the brake is actuated by a displacement of the pressure plate including the brake lining 20 parallel to the friction face of the brake disk, in the rotational direction or circumferential direction of the latter.

The displacement is preferably brought about by the exemplary crank drive 35, 36 which acts by way of an output and crank pin 35 approximately centrally on the pressure plate 18 of the brake lining unit 18, 20, and is mounted parallel to the rotational axis of the brake disk in the brake application housing or brake caliper 1.

The crank drive is actuated via the electric drive, for example, the electric motor 23 with a gear mechanism 24 which is connected behind it.

The lowest point of the recesses or ramps 14 is in each case configured advantageously in such a way that the rolling bodies, in particular balls, are latched at the lowest point and can be released from the depression only counter to a minimum latching force.

The crank pin 35 is therefore mounted in the pressure plate or in the brake lining unit which includes the latter in such a way that the brake lining has to follow the movement path of the crank pin 35. The ramps 14 are therefore configured as grooves 37 which have a curved shape (see FIGS. 3, 4 and 5).

In this exemplary embodiment, the double direction ramp profile (recess 14) in the adjusting pistons 5, 6 makes a self-energizing action possible in both driving directions. Control of the lining displacement which is dependent on the rotational direction of the wheel can be realized.

Since the brake lining unit 20 is held in the region, of the crank pin by a positively mounted engagement of the crankpin 35, the brake lining unit 20 describes a type of curved movement during brake application, which curved movement leads to the brake lining unit 20 approximately following the curved shape of the brake disk ring geometry in this region, given suitable adaptation of the curved shape, which prevents the lining from digging into the brake disk, since it covers a great region of the brake disk ring during brake application. For example, in FIG. 4 the outer edge of the brake disk ring can be seen.

Figure 5:
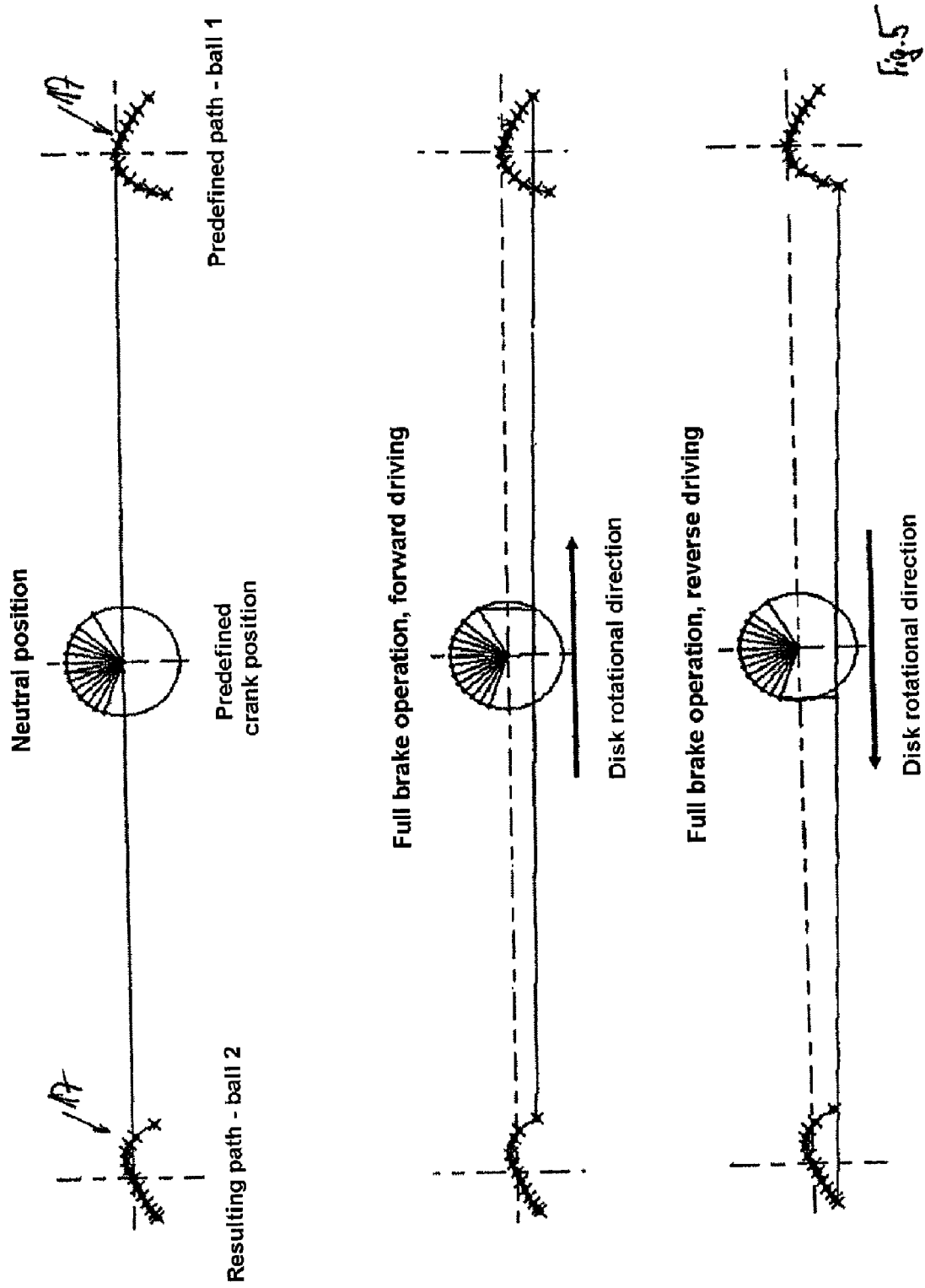
FIG. 5 shows a comparative overview of the behavior of rolling bodies in curved paths during brake operations in different driving directions and in the neutral position (unbraked position).

In the exemplary embodiment, starting from the lowest point in the ramps or grooves, a curved path is formed in both directions, with the result that one of the grooves 37 can be used in each case as a ramp which is inclined with respect to the brake disk for self-energizing during forward driving, and the other can be used for self-energizing during reverse driving, as seen also in FIG. 5. Depending on the driving direction, one of the rolling bodies (ball 1 in FIG. 5) lies "at the front" in the driving direction during the braking operation.

The exemplary brake lining unit is moved by the crank pin 35 and one of the rolling bodies onto a curved path (see, for example, FIG. 5 at the top), so that the second rolling body 16 (ball 1, ball 2) which lies at the back, in each case follows this movement. FIG. 5 illustrates this situation using a comparison of "neutral position, full brake operation, forward driving and full brake operation, reverse driving". The result of this is that, starting from the lowest point in the ramps, the two curved paths should not in each case be identical in the two rotational directions. In the event of a deflection of the crank 34, the rolling bodies follow the predefined curved paths of the ramps and run onto the latter.

FIG. 1 is distinguished by a constant ramp angle α. A particularly simple structural design is therefore achieved which is distinguished by a robust construction, satisfactory functional reliability and low production costs. In particular, an electric motor 23 having a surprisingly low output power can be used. Here, the balls 16 are suitable for use as inexpensive rolling bodies, which align themselves as it were in the ramp face. In order to increase the loadbearing capability, the balls can also run in adapted running grooves. In contrast, an alternative variant having rollers as rolling bodies 16 would have a particularly low hysteresis.

It is conceivable to provide a separate drive for the brake plungers or else to combine the adjusting and crank drives shown in FIG. 1 and FIG. 2. The latter has the advantage that only a single drive motor is required for both functions. It is also conceivable here to overcome the air play by way of the separate adjusting drive. It is further conceivable to overcome the air play by way of the crank drive by using a particularly "steep ramp" at the beginning of displacement.

The following list of reference numerals is provided to assist in understanding the drawings and specification.

Brake caliper 1
Brake disk 2
Openings 3, 4
Brake plungers 5, 6
Bearing balls 7, 8
Sliding bearing shells 9, 10
Rear wall 11
Spindle 12
Nut 13
Ramp-like recess 14
Rolling body 16
Sliding bearing shells 17
Recesses 15
Pressure plate 18
Carrier plate 19
Brake lining 20
Brake lining material 21
Clamp spring 22
Drive motor 23
Step down gear mechanism 24
Output shaft 25
Gear mechanism 26
Sun gear 27
Planetary gears 28
Ring 29
Gearwheels 30
Flange 31
Compression springs 32
Planetary star 33
Crank 34
Crank pin 35
Opening 36
Groove 37
Ramp angle α
Longitudinal axis LA
Circumferential direction U
Brake disk axis BA The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A self-energizing disk brake having an electric actuator for applying an actuating force, comprising:
  a self-energizing device for boosting the electric actuator, arranged between the actuator and at least one brake lining;
  a brake application unit for applying the at least one brake lining to one side of a brake disk, while an application movement of the brake lining to the brake disk is carried out, the application movement being resolvable into at least one parallel movement component and at least one movement component extending one of tangentially and perpendicularly relative to a rotational axis of the brake disk; and
  at least one electric motor drive of the electric actuator for actuating the brake application unit to apply the actuating force,
  wherein the brake application unit moves the brake lining on an arched curved path, parallel to a friction face of the brake disk,
  the brake application unit having a crank which has a crank pin, the crank having a crank axis extending parallel to the rotational axis of the brake disk and serving to move the brake lining tangentially with respect to the brake disk, parallel to the friction face of the brake disk, and engages positively into a corresponding opening in a pressure plate of the brake lining.

2. Disk brake as claimed in claim 1, wherein the brake application unit moves the brake lining parallel to the brake disk on a curved path approximating a ring geometry of the brake disk.

3. Disk brake as claimed in claim 1, wherein the brake application unit has at least one brake plunger oriented parallel to the rotational axis of the brake disk and supported at one end on one of a brake caliper of the disk brake and a component connected to the brake caliper via a bearing device permitting a rotation of at least one part of the brake plunger about a longitudinal axis.

4. Disk brake as claimed in claim 3, wherein the brake application unit has two brake plungers.

5. Disk brake as claimed in claim 3, wherein the at least one plunger has a pressure face, and the pressure face of the at least one plunger is provided on its side facing the brake lining with a recess having a ramp-shaped contour, into which a rolling body engages, which is supported on one side by the ramp-shaped contour of the pressure face of the at least one plunger and on another side by the brake lining.

6. Disk brake as claimed in claim 3, wherein the brake lining is provided, on a side which faces the at least one plunger, with at least one recess having a ramp-shaped contour, into which a rolling body engages, which is supported on one side by the ramp-shaped contour of the brake lining and on the other side by the at least one plunger.

7. Disk brake as claimed in claim 6, wherein the ramp-shaped contour is configured in the shape of a groove which describes a curved path.

8. Disk brake as claimed in claim 7, wherein, starting from a lowest point, the groove describes a curved path in two directions.

9. Disk brake as claimed in claim 8, wherein, starting from the lowest point of the ramp-shaped contour, the groove describes curved paths having different geometry in the two directions.

10. Disk brake as claimed in claim 9, wherein the at least one recess having a ramp-shaped contour comprises at least two recesses, each groove of each recess having said curved paths having different geometry in the two directions having a shape which is not identical to another of said recesses, such that when the brake lining is caused to perform rotational movement relative to the brake disk in response to movement of the crank pin, the brake lining also rotates relative to an initial orientation of the brake lining.

11. Disk brake as claimed in claim 7, wherein the groove has a circular segment shape, a radius thereof corresponding to a radius of a circular path which the crank pin describes during a braking operation.

12. Disk brake as claimed in claim 1, further comprising a single adjusting apparatus having an electric motor as a drive, arranged exclusively on a reaction side of the disk brake facing away from the brake application unit.

* * * * *